(12) United States Patent
Dubey et al.

(10) Patent No.: US 11,132,167 B2
(45) Date of Patent: Sep. 28, 2021

(54) MANAGING DISPLAY OF CONTENT ON ONE OR MORE SECONDARY DEVICE BY PRIMARY DEVICE

(71) Applicant: Samsung Electronics Co., Ltd., Suwon-si (KR)

(72) Inventors: Gourav Kumar Dubey, Noida (IN); Ankita Gupta, Gurgaon (IN); Dharya Arora, Kaithal (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 16/475,018

(22) PCT Filed: Dec. 26, 2017

(86) PCT No.: PCT/KR2017/015468
§ 371 (c)(1),
(2) Date: Jun. 28, 2019

(87) PCT Pub. No.: WO2018/124689
PCT Pub. Date: Jul. 5, 2018

(65) Prior Publication Data
US 2019/0369944 A1     Dec. 5, 2019

(30) Foreign Application Priority Data
Dec. 29, 2016   (IN) .............................. 201641044890

(51) Int. Cl.
*G06F 3/14*        (2006.01)
*G06F 3/0481*      (2013.01)
(Continued)

(52) U.S. Cl.
CPC ............ *G06F 3/1454* (2013.01); *G06F 1/163* (2013.01); *G06F 1/1692* (2013.01); *G06F 3/0481* (2013.01); *G06F 3/04842* (2013.01)

(58) Field of Classification Search
CPC ...... G06F 3/1454; G06F 1/163; G06F 1/1692; G06F 3/0481; G06F 3/04842; G06F 3/0484
See application file for complete search history.

(56) References Cited

U.S. PATENT DOCUMENTS 8,457,651 B2 *   6/2013   Forutanpour .......... G06F 16/176
                                              455/456.1
8,464,184 B1 *   6/2013   Cook ................... G06F 3/04883
                                              715/863

(Continued)

FOREIGN PATENT DOCUMENTS

| CA | 2747589 A1 | 2/2012 |
| CN | 101385318 A | 3/2009 |

(Continued)

OTHER PUBLICATIONS

ISA/KR, "International Search Report and Written Opinion of the International Searching Authority," International Application No. PCT/KR2017/015468, dated Apr. 4, 2018, 10 pages.

(Continued)

*Primary Examiner* — Benyam Ketema

(57) ABSTRACT

Embodiments herein achieve a method for managing display of content on one or more secondary device by a primary device. The method includes causing, by the primary device, to display a user interface comprising the content and a graphical representation of the at least one secondary device connected to the primary device. Further, the method includes detecting by the primary device an input performed to select at least one portion of the content to be displayed on the at least one secondary device. Further, the method includes transmitting by the primary device the at least one selected portion of the content to the secondary device. One (Continued)

or more selected portion is dynamically modified based on information about the at least one secondary device.

11 Claims, 14 Drawing Sheets

(51) Int. Cl.
*G06F 1/16* (2006.01)
*G06F 3/0484* (2013.01)

(56) References Cited

U.S. PATENT DOCUMENTS

| | | | |
|---|---|---|---|
| 8,490,002 B2 | 7/2013 | Fai | |
| 8,554,897 B2* | 10/2013 | Kim | H04L 65/403 |
| | | | 709/223 |
| 9,055,404 B2* | 6/2015 | Setlur | G06F 1/1694 |
| 9,226,015 B2* | 12/2015 | Matsunaga | H04M 1/72412 |
| 9,329,827 B2 | 5/2016 | Lavine et al. | |
| 9,826,078 B2* | 11/2017 | Kim | H04M 1/72412 |
| 9,965,238 B2* | 5/2018 | Han | H04N 21/4302 |
| 2007/0146347 A1* | 6/2007 | Rosenberg | G08C 17/02 |
| | | | 345/173 |
| 2007/0195105 A1 | 8/2007 | Koberg | |
| 2010/0287513 A1* | 11/2010 | Singh | G06F 3/017 |
| | | | 715/863 |
| 2011/0083111 A1* | 4/2011 | Forutanpour | G06F 1/1694 |
| | | | 715/863 |
| 2011/0184862 A1 | 7/2011 | Lanier et al. | |
| 2014/0282066 A1* | 9/2014 | Dawson | H04L 65/4038 |
| | | | 715/748 |
| 2015/0120817 A1* | 4/2015 | Jeong | G06F 3/1454 |
| | | | 709/203 |
| 2015/0356949 A1 | 12/2015 | Kim | |
| 2016/0085266 A1* | 3/2016 | Lee | G06F 3/1454 |
| | | | 348/240.2 |
| 2016/0110012 A1* | 4/2016 | Yim | G06F 1/1626 |
| | | | 345/173 |
| 2016/0117141 A1* | 4/2016 | Ro | G06F 3/04817 |
| | | | 715/748 |
| 2016/0119464 A1* | 4/2016 | Kim | H04L 65/4069 |
| | | | 455/566 |
| 2016/0350060 A1* | 12/2016 | Park | G06F 3/0231 |
| 2017/0322711 A1* | 11/2017 | Robinson | G06F 3/0482 |
| 2017/0353686 A1* | 12/2017 | Shin | G06F 3/0487 |

FOREIGN PATENT DOCUMENTS

| | | |
|---|---|---|
| KR | 10-2015-0049900 A | 5/2015 |
| KR | 10-2015-0141313 A | 12/2015 |
| KR | 10-2016-0045269 A | 4/2016 |
| KR | 10-2016-0074990 A | 6/2016 |
| WO | 2016088922 A | 6/2016 |

OTHER PUBLICATIONS

Office Action in connection with Indian Application No. 201641044890 dated Dec. 30, 2019, 6 pages.

* cited by examiner

MANAGING DISPLAY OF CONTENT ON ONE OR MORE SECONDARY DEVICE BY PRIMARY DEVICE

CROSS-REFERENCE TO RELATED APPLICATIONS

This application is a National Phase Entry of PCT International Application No. PCT/KR2017/015468, which was filed on Dec. 26, 2017 and claims priority Indian Patent Application No. 201641044890, filed on Dec. 29, 2016, in the Indian Intellectual Property Office the disclosure of which is incorporated herein by reference in its entirety.

BACKGROUND

1. Field

The present disclosure relates generally to the field of a display management system, and more specifically to the field of a method, a system and a primary device for managing display of a content on one or more secondary device(s).

2. Description of Related Art

A user can have multiple wearable devices (e.g., smart watch or the like) paired/connected with a primary device (e.g., smartphone, or the like) based on the user usability, interest, fashion etc. The wearable devices are generally available in multiple shapes and sizes. While transferring a content from the primary device to the wearable device, the content is not properly visible on the wearable device due to a small screen size and/or difference in shape of the wearable device with respect to the primary device.

Further, the user of the wearable device either has to delete the content from the wearable device or compromise with the visibility of the content. Also, due to the small screen size, the user of the wearable device may not able to modify the content on the wearable device itself.

Further, due to the small screen size of the wearable device, the wearable device may be desirable to the user to view only a specific portion of the content (i.e., particular object of interest) on the wearable device.

Hence, there is a need of a robust system and method for managing display of the content on the wearable devices.

SUMMARY

An aspect of the present disclosure provides a method, a system and a primary device for managing display of a content on one or more secondary device.

Another aspect of the present disclosure provides a user interface including the content and a graphical representation of one or more secondary devices connected to the primary device.

Another aspect of the present disclosure detects, by the primary device, an input performed to select one or more portion of the content to be displayed on one or more secondary devices.

Another aspect of the present disclosure detects, by the primary device, a second input performed on the graphical representation to select a secondary device from the plurality of secondary devices.

Another aspect of the present disclosure receives, by a first primary device, a portion of the content to be transferred from a first secondary device connected to the first primary device.

Another aspect of the present disclosure selects, by the first primary device, at least one second secondary device connected to a second primary device based on the information about the first secondary device.

Another aspect of the present disclosure to transmits, by the primary device, one or more selected portion of the content to the secondary device.

Another aspect of the present disclosure provides a preview of the one or more selected portion of the content dynamically displayed in the graphical representation of one or more secondary device displayed in the user interface of the primary device.

According to an aspect of example embodiments, a method for managing display of content on at least one secondary device is provided by a primary device. The method includes causing, by the primary device, to display a user interface including the content and a graphical representation of the at least one secondary device connected to the primary device. Further, the method includes detecting by the primary device an input performed to select at least one portion of the content to be displayed on the at least one secondary device. Furthermore, the method includes transmitting by the primary device the at least one selected portion of the content to the secondary device. The at least one selected portion is dynamically modified based on information about the at least one secondary device.

In an embodiment, the information about of the at least one secondary device includes at least one of shape information, size information and a window size.

In an embodiment, a preview of the at least one selected portion of the content is dynamically displayed in the graphical representation of the at least one of the secondary device displayed in the user interface of the primary device.

In an embodiment, the at least one selected portion includes one of a single segment of the content and a set of segments of the content determined based on the input.

In an embodiment, each segment of the content is determined and stored in a temporary storage unit.

In an embodiment, each segment of the content is dynamically modified and packaged in a media file.

In an embodiment, the preview is displayed before transmitting the one or more selected portion to the content to the secondary device.

In an embodiment, the input performed to select the at least one portion includes performing the input to create a pattern on the content, and selecting the at least one portion of the content corresponding to the pattern.

In an embodiment, the input performed to select the at least one portion includes displaying a plurality of templates including a pattern, performing the input to select a template from the plurality of templates, and selecting the at least one portion of content covered by the pattern defined by the selected template.

In an embodiment, the media file is configured to play back an animation of the segments of the content on the at least one secondary device.

In an embodiment, the user interface is dynamically updated to display a graphical representation of new secondary device connected to the primary device.

In an embodiment, the primary device is configured to receive and store the information about the new secondary device based on the connection.

According to another aspect of example embodiments, a method for managing display of content on a plurality of secondary devices is provided by a primary device. The method includes causing, by the primary device, to display a user interface including the content and a graphical representation of the plurality of secondary devices connected to the primary device. Further, the method includes detecting by the primary device a first input performed to select at least one portion of the content. Further, the method includes detecting by the primary device a second input performed on the graphical representation to select a secondary device from the plurality of secondary devices. Furthermore, the method includes transmitting by the primary device the at least one selected portion of the content to the selected secondary device. The at least one selected portion is dynamically modified based on information about the selected secondary device.

According to another aspect of example embodiments, a method for managing display of content is provided. The method includes receiving, by the first primary device, a portion of the content to be transferred from a first secondary device connected to the first primary device. Further, the method includes selecting by the first primary device at least one second secondary device connected to a second primary device based on the information about the first secondary device. Furthermore, the method includes transmitting by the first primary device the portion of the content to the selected second secondary device.

According to another aspect of example embodiments, a primary device for managing display of content on at least one secondary device is provided. The primary device includes a display unit configured to display a user interface including the content and a graphical representation of the at least one secondary device connected to the primary device. A content adaptation unit is configured to detect an input performed to select at least one portion of the content to be displayed on the secondary device. Further, the content adaptation unit is configured to transmit the at least one selected portion of the content to the secondary device. The at least one selected portion is dynamically modified based on information about the at least one secondary device.

According to another aspect of example embodiments, a primary device for managing display of content on a plurality of secondary devices is provided. The primary device includes a display unit configured to display the content and a graphical representation of the plurality of secondary devices connected to the primary device. A content adaptation unit is configured to detect a first input performed to select at least one portion of the content to be displayed on the plurality of secondary devices. Further, the content adaptation unit is configured to detect a second input performed on the graphical representation to select a secondary device from the plurality of secondary devices. Further, the content adaptation unit is configured to transmit the at least one selected portion of the content to the selected secondary device. The at least one selected portion is dynamically modified based on information about the selected secondary device.

According to another aspect of example embodiments, a system for managing display of content is provided. The system includes a first primary device connected to at least one first secondary device. A second primary device is connected to at least one second secondary device. The first primary device is configured to receive a portion of the content to be transferred from a first secondary device connected to the first primary device. The first primary device is configured to select at least one second secondary device based on the information about the first secondary device. Further, the first primary device is configured to transmit the portion of the content to the selected second secondary device.

According to another aspect of example embodiments, a computer program product including a computer executable program code recorded on a computer readable non-transitory storage medium is provided. The computer executable program code when executed, performs the actions including causing, by a primary device, to display a user interface including a content and a graphical representation of one or more secondary device connected to the primary device. The computer executable program code when executed, performs the actions including detecting, by the primary device, an input performed to select one or more portion of the content to be displayed on one or more secondary device. The computer executable program code when executed, performs the actions including transmitting, by the primary device, one or more selected portion of the content to the secondary device. The selected portion is dynamically modified based on information about the at least one secondary device.

According to another aspect of an example embodiments, a computer program product including a computer executable program code recorded on a computer readable non-transitory storage medium is provided. The computer executable program code when executed, performs the actions including causing, by the primary device, to display a user interface including a content and a graphical representation of the plurality of secondary devices connected to the primary device. The computer executable program code when executed, performs the actions including detecting, by the primary device, a first input performed to select at least one portion of the content. The computer executable program code when executed, performs the actions including detecting, by the primary device, a second input performed on the graphical representation to select a secondary device from the plurality of secondary devices. The computer executable program code when executed, performs the actions including transmitting, by the primary device, the at least one selected portion of the content to the selected secondary device. The at least one selected portion is dynamically modified based on information about the selected secondary device.

According to another aspect of an example embodiments, a computer program product including a computer executable program code recorded on a computer readable non-transitory storage medium is provided. The computer executable program code when executed, performs the actions including receiving, by a first primary device, a portion of a content to be transferred from a first secondary device connected to the first primary device. The computer executable program code when executed, performs the actions including selecting, by the first primary device, at least one second secondary device connected to a second primary device based on the information about the first secondary device. The computer executable program code when executed, performs the actions including transmitting, by the first primary device, the portion of the content to the selected second secondary device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
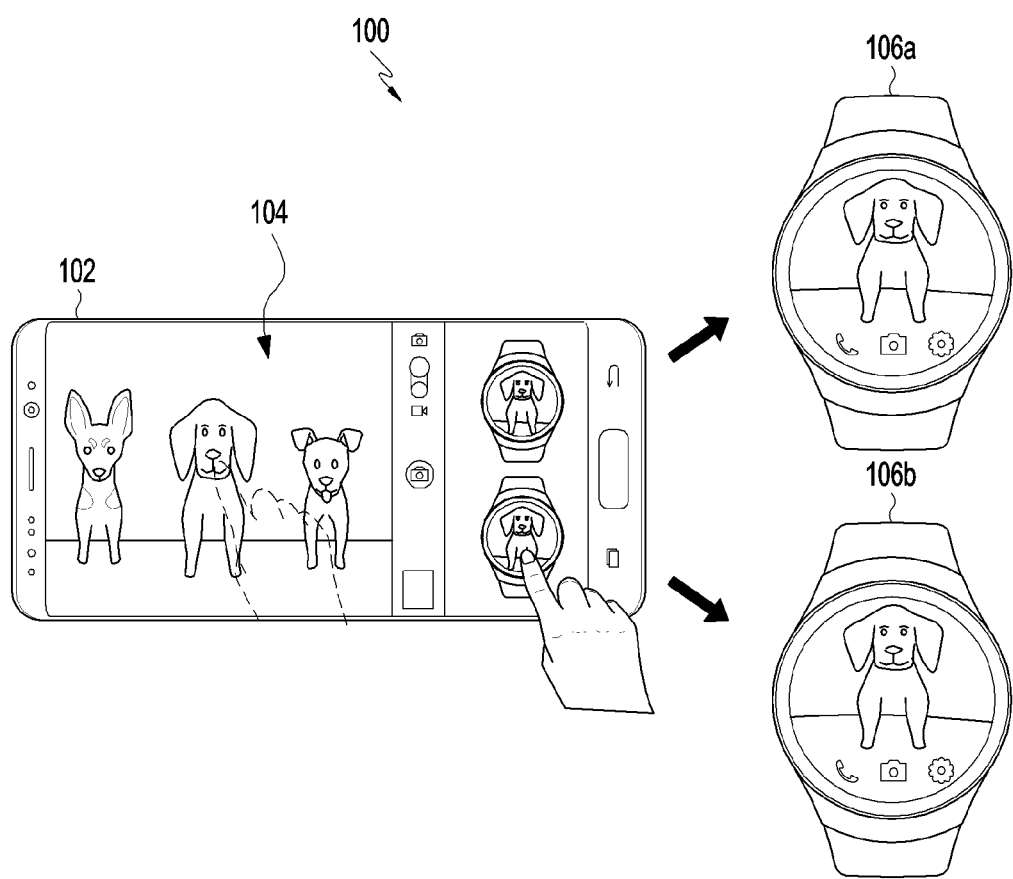
FIG. 1 is a diagram illustrating a exemplary system for managing display of content on one or more secondary devices by a primary device, according to an exemplary embodiment.

The present disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of this disclosure. Likewise, the blocks of the embodiments may be physically combined into more complex blocks without departing from the scope of this disclosure.

Embodiments herein provide a method for managing display of a content on one or more secondary device by a primary device. The method includes causing, by the primary device, to display a user interface including the content and a graphical representation of one or more secondary device connected to the primary device. Further, the method includes detecting, by the primary device, an input performed to select one or more portion of the content to be displayed on one or more secondary device. Furthermore, the method includes transmitting, by the primary device, one or more selected portion of the content to the secondary device. One or more selected portion is dynamically modified based on information about one or more secondary device.

Unlike the conventional methods and systems, the proposed method can be used to edit and modify the content (e.g., image, photo, video, wallpaper, multimedia content or the like) for one or more connected/paired wearable devices based on shape and size information of the connected/paired wearable devices. Further, the multimedia content is cropped according to shape and size of the wearable device on the primary device (e.g., smart phone, laptop, tablet or the like) itself.

The multimedia content is basically a combination of multiple objects multiple frames). Hence, the multimedia content is modified based on objects of user's interest. Further, the content with specific objects are created and shared with the wearable device easily.

Unlike the conventional methods and systems, the proposed method allows the user to modify the multimedia content for multiple wearable devices with less or least effort. Further, the preview option is available for the user to view the content with exact dimensions of the wearable device. This results in improving the user experience. The proposed method allows the user to modify the multimedia content for multiple wearables without using a third party device (i.e., server or the like).

Unlike the conventional methods and systems, the proposed method can be used to edit/modify the multimedia content easily according to the shape and size of the wearable device. The proposed method can be used to provide a choice to select any object from the multimedia content and modify the multimedia content to fit on the wearable device's screen. The proposed method can be used to reduce the effort and time involved to do the same with current available procedures, also the proposed method can be used to intelligently suggest the best fit content for the wearable device based on its shape and size.

Unlike the conventional method and systems, the proposed method can be used to provide the preview content along with the wearable device actual shape and size, hence the user of the primary device can check if the content is easily viewable on the wearable device screen or not. This results in improving the user experience.

The proposed method can be used to create the wearable specific content and provide the preview about the content on the primary device. Hence, it removes the user constraint to see the how the content appears on the wearable device.

The proposed method can be used to create the wearable specific content and provide the preview about the content on the primary device over an Internet of things (IOT) environment. The proposed method can be used to edit/modify the multimedia content easily according to the shape and size of the wearable device over the IOT environment. The proposed method can be used to provide the choice to select y object from the multimedia content and modify the multimedia content to fit on the wearable device's screen over the IOT environment.

The current mechanism can be used to modify the content by resizing of content based on a device coordinates only. The current mechanism does not consider the specific object of the user's interest. The current mechanism considers only the size of the primary device, when resizing or cropping or modifying the content. The current mechanism does not consider the shape of the wearable device. But, the proposed method can be used to create the output content according to the user's interest.

The proposed method can be used to provide an easy way for the user to select the area of his/her choice. The proposed method can be easily deployed with existing wearables connection manager application e.g., gear manager or the like.

The proposed method can be used to recreate a new content only when required by the user. Hence, overhead of creating the plurality of content are eliminated.

Referring now to the drawings, and more particularly to FIGS. 1 through 12, there are shown preferred embodiments.

FIG. 1 is a diagram illustrating a exemplary system 100 for managing display of content on one or more secondary devices 106a and 106b by a primary device 102, according to an exemplary embodiment. In an embodiment, the system 100 includes a primary device 102, a user interface 104 and secondary devices 106a and 106b (Hereafter, label of the secondary device is 106). The primary device 102 can be, for example but not limited to, a smartphone, a Personal Digital Assistant (PDA), a tablet computer, a laptop or the like. The secondary device 106 can be, for example but not limited to, a smart watch, a smart glass, a smart ring or a wearable device having a display unit. The content be, for example but not limited to, an image, a photo, a video, a wallpaper, a multimedia content or the like.

In an embodiment, the primary device 102 is configured to display the user interface 104 having the content and a graphical representation of one or more secondary devices 106 connected to the primary device 102.

In an embodiment, the user interface 104 will be displayed on the primary device 102. The user interface 104 is divided in two portions. One portion of the user interface 104 contains the content from a storage unit (i.e., the content is obtained from a gallery of the primary device 102) or from a live scene (i.e., the content is obtained while capturing the live scene). Another portion of the user interface 104 displays the shape of connected/paired secondary device 106 along with information (e.g., actual size of the wearable device, shape information of the wearable device, or the like).

Further, the primary device 102 is configured to detect an input performed to select one or more portion of the content to be displayed on the secondary device 106. In an embodiment, the at least one selected portion includes one of a single segment of the content and a set of segments of the content determined based on the user input.

In an embodiment, the input performed to select the at least one portion includes performing the input to create a pattern on the content, and selecting the at least one portion of the content corresponding to the pattern.

In an embodiment, the input performed to select the at least one portion includes displaying a plurality of templates including a pattern, performing the input to select a template from the plurality of templates, and selecting the at least one portion of content covered by the pattern defined by the selected template.

In an embodiment, each segment of the content is determined and stored in a temporary storage unit (not shown). Each segment of the content is dynamically modified and packaged in a media file. In an embodiment, the media file is configured to play back an animation of the segments of the content on the one or more secondary device 106.

In an embodiment, each of the segments are dynamically determined based on a time unit.

After detecting the input performed to select one or more portion of the content to be displayed on the secondary device 106, a preview of the one or more selected portion of the content is dynamically displayed in the graphical representation of the secondary device 106 displayed in the user interface 104 of the primary device 102.

In an embodiment, the preview is displayed before transmitting the one or more selected portion to the content to the secondary device 106.

The one or more selected portion is dynamically modified based on the information about the at least one secondary device 106. The information can be, for example but not limited to, shape information (e.g., circular shape, square shape, rectangular shape or the like), size information and a window size of the secondary device 106.

The information can also be, for example but not limited to, a window scale of the secondary device 106, a parameter corresponding to a display unit of the secondary device 106, a metadata information, and a file type information related to a content format.

In an embodiment, the user interface 104 is dynamically updated to display the graphical representation of new secondary device 106 connected to the primary device 102. Further, the primary device 102 is configured to receive and store the information about the new secondary device 106 after stabling the connection.

In an embodiment, in case of a new wearable device 106 connected/paired to the primary device 102, the shape and size information is to be requested by the secondary device 106. Based on the secondary device shape and size information, the storage unit stores information on the shape and size of the secondary device. The primary device 102 displays the selected portion of the content according to the information on the shape and size of connected/paired wearable device, that is, the secondary device.

Further, the primary device 102 is configured to transmit one or more selected portion of the content to the secondary device 106.

In an embodiment, the primary device 102 is configured to display the content and the graphical representation of the plurality of secondary devices 106 connected to the primary device 102. Further, the primary device 102 is configured to detect a first input performed to select one or more portion of the content to be displayed on the plurality of secondary devices 106. Further, the primary device 102 is configured to detect a second input performed on the graphical representation to select the secondary device from the plurality of secondary devices 106.

Further, the primary device 102 is configured to transmit the one or more selected portion of the content to the selected secondary device 106. The one or more selected portion is dynamically modified based on the information about the selected secondary device 106.

In an embodiment, the shape and size information of the secondary device 106 is requested by the primary device 102. The secondary device 106 contains the information as manufacturing information.

Unlike the conventional systems, the proposed system 100 provides flexibility to modify the content. Hence, the content can be modified for multiple wearable device with less or least effort. The proposed system 100 can be used to create the content for the connected/paired wearable device directly from the primary device 102 in an effective manner.

In an embodiment, a first primary device is connected to at least one first secondary device. A second primary device is connected to at least one second secondary device. The first primary device is configured to receive a portion of the content to be transferred from the first secondary device connected to the first primary device. Further, the first primary device is configured to select at least one second secondary device based on the information about the first secondary device. Further, the first primary device is configured to transmit by the primary device the portion of the content to the selected second secondary device.

The system 100 enables the user to easily preview the content on his/her primary device itself with actual shape and size. The system 100 allows the user an intuitive way to edit the content based on the secondary device's shape. Further, the content is directly sent to the secondary device from the primary device in an easy manner.

The FIG. 1 shows the limited overview of the system 100 but, it is to be understood that other embodiments are not limited thereto. Further, the system 100 can include any number of hardware or software components communicating with each other, such as transceivers or communication interfaces. Further, the labels first and second are only used for illustrative purpose and not limiting the scope of this disclosure. For example, the component can be, but not limited to, a process running in the controller or processor, an object, an executable process, a thread of execution, a program, or a computer.

Figure 2:
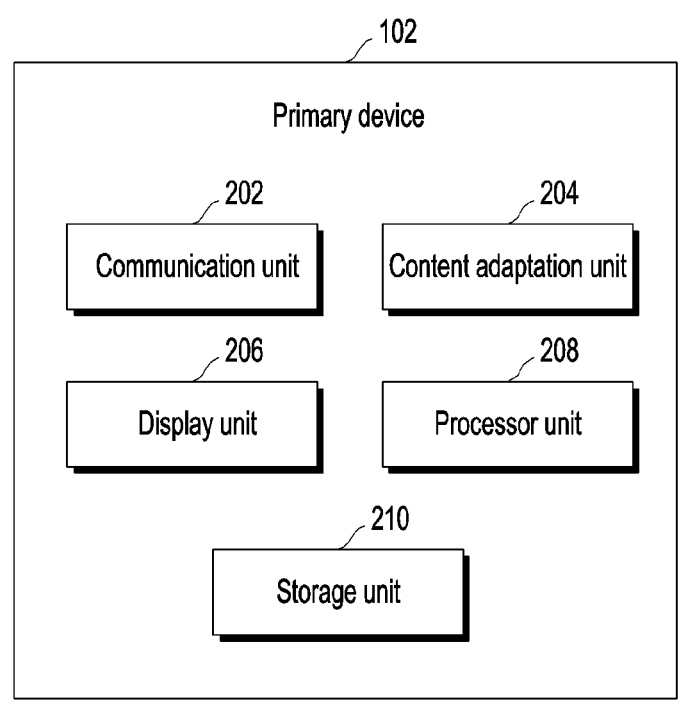
FIG. 2 is a block diagram illustrating various units of the primary device, according to an exemplary embodiment.

FIG. 2 is a block diagram illustrating various units in the primary device 102, according to an exemplary embodiment. In an embodiment, the primary device 102 includes a communication unit 202, a content adaptation unit 204, a display unit 206, a processor unit 208 and a storage unit 210. The communication unit 202 establishes the communication between the primary device 102 and the secondary device 106. The communication unit 202 is configured for communicating internally between internal units and with external devices via one or more networks. The processor unit 208 is connected with the content adaptation unit 204, the display unit 206, communication unit 202, and the storage unit 210. The processor unit 208 may be at least one processor. The communication unit 202 may be at least one transceiver.

In an embodiment, the display unit 206 is configured to display the user interface 104 having the content and the graphical representation of one or more secondary devices 106 connected to the primary device 102. Further, the content adaptation unit 204 is configured to detect the input performed to select one or more portion of the content to be displayed on the secondary device 106.

In an embodiment, one or more selected portion includes one of the single segment of the content and the set of segments of the content determined based on the input.

In an embodiment, each segment of the content s determined and stored in the storage unit 210. Each segment of the content is dynamically modified and packaged in the media file. In an embodiment, the media file is configured to play back the animation of the segments of the content on the at least one of the secondary device 106.

Further, the storage unit 210 is configured to store the multimedia content, the shape information of the secondary device 106, the size information of the secondary device 106, the window size of the of the secondary device 106, the window scale of the secondary device 106, a parameter corresponding to the display unit of the secondary device 106, the metadata information, the file type information related to the content format, and the content information related to the secondary device 106.

After detecting the input performed to select one or more portion of the content to be displayed on the secondary device 106, the content adaptation unit 204 is dynamically configured to display preview of one or more selected portion of the content in the graphical representation of the secondary device 106 in the user interface 104 of the primary device 102.

Further, the content adaptation unit 204 is configured to modify one or more selected portion dynamically based on the information about the one or more secondary device 106.

In an embodiment, the user interface 104 is dynamically updated to display the graphical representation of new secondary device 106 connected to the primary device 102. Further, the communication unit 202 is configured to receive and store the information about the new secondary device 106 based on the connection.

Further, the communication unit 202 is configured to transmit the at least one selected portion of the content to the secondary device 106.

In an embodiment, the display unit 206 is configured to display the content and the graphical representation of the plurality of secondary devices 106 connected to the primary device 102. Further, the content adaptation unit 204 is configured to detect the first input performed to select at least one portion of the content to be displayed on the plurality of secondary devices 106. Further, the content adaptation unit 204 is configured to detect the second input performed on the graphical representation to select the at least one secondary device from a plurality of secondary devices 106.

Further, the storage unit 210 may include one or more computer-readable storage media. The storage unit 210 may include non-volatile storage elements. Examples of the non-volatile storage elements may include magnetic hard disc, optical discs, floppy discs, flash memories, or forms of electrically programmable memories (EPROM) or electrically erasable and programmable (EEPROM) memories. In addition, the storage unit 210 may, in some examples, be considered a non-transitory storage medium. The term "non-transitory" may indicate that the storage medium is not embodied in a carrier wave or a propagated signal. However, the term "non-transitory" should not be interpreted that the storage unit 210 is non-movable. In some examples, the storage unit 210 can be configured to store larger amounts of information than a memory. In certain examples, a non-transitory storage medium may store data that can, over time, change (e.g., in Random Access Memory (RAM) or cache).

Although FIG. 2 shows exemplary units of the primary device 102, in other implementations, the primary device 102 may include fewer components, different components, differently arranged components, or additional components than depicted in the FIG. 2. Additionally or alternatively, one or more components of the primary device 102 may perform functions described as being performed by one or more other components of the primary device 102. The one or more components of the primary device 102 may be operated by at least one processor coupled to at least one transceiver and a memory.

Figure 3:
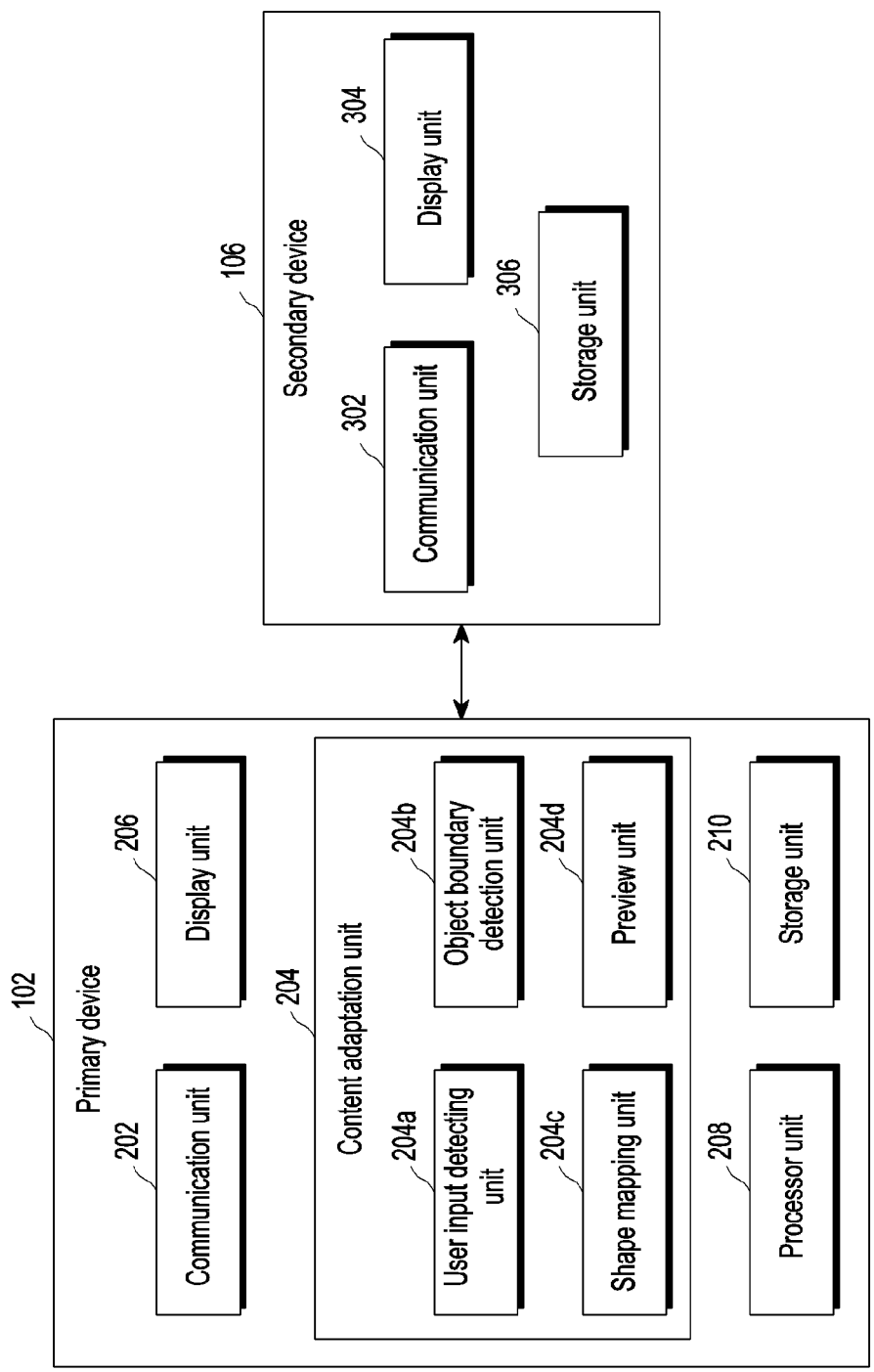
FIG. 3 is a block diagram illustrating the system for managing display of the content on the secondary device by the primary device, according to an exemplary embodiment.

FIG. 3 is a block diagram illustrating the system 100 for managing display of the content on the secondary device 106 by the primary device 102, according to an exemplary embodiment. The system 100 includes the primary device 102 and the secondary device 106. The operations and functionalities of the primary device 102 and the secondary device 106 are explained in conjunction with the FIG. 1 and FIG. 2. Further, the content management unit 204 includes a user input detecting unit 204a, an object boundary detection unit 204b, a shape mapping unit 204c, and a preview unit 204d. The user input detecting unit 204a is configured to detect the first input performed to select one or more portion of the content. Further, the user input detecting unit 204a is configured to detect the second input performed on the graphical representation to select the at least one secondary device from a plurality of secondary devices.

Based on detecting the inputs, the object boundary detection unit 204b and the shape mapping unit 204c are configured to modify one or more selected portion dynamically based on the information about the one or more secondary device 106. After modifying one or more selected portion, the preview unit 204d is dynamically configured to preview of one or more selected portion of the content in the graphical representation of the secondary device 106 displayed in the user interface 104 of the primary device 102.

Further, the secondary device 106 includes a communication unit 302, a display unit 304, and a storage unit 306. The communication unit 302 establishes the communication between the primary device 102 and the secondary device 106. Further, the communication unit 302 is configured for communicating internally between internal units and with external devices via one or more networks. The communication unit 302 is at least one transceiver. The display unit 304 is configured to display the content received from the primary device 102. Further, the storage unit 306 is configured to store the multimedia content, the shape information of the secondary device 106, the size information of the secondary device 106, the window size of the of the secondary device 106, the metadata information.

Further, the storage unit 306 may include one or more computer-readable storage media. The storage unit 306 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 306 may, in some examples, be considered a nary-transitory storage medium. The term "non-transitory" may indicate that the storage medium is not embodied in a carrier wave or a propagated signal. However, the term "non-transitory" should not be interpreted that the storage unit 306 is non-movable. In some examples, the storage unit 306 can be configured to store larger amounts of information than a memory. In certain examples, a non-transitory storage medium may store data that can, over time, change (e.g., in Random Access Memory (RAM) or cache).

Although FIG. 3 shows exemplary units of the system 100, in other implementations, the system 100 may include fewer components, different components, differently arranged components, or additional components than depicted in the FIG. 3. Additionally or alternatively, one or more components of the system 100 may perform functions described as being performed by one or more other components of the system 100.

Figure 4:
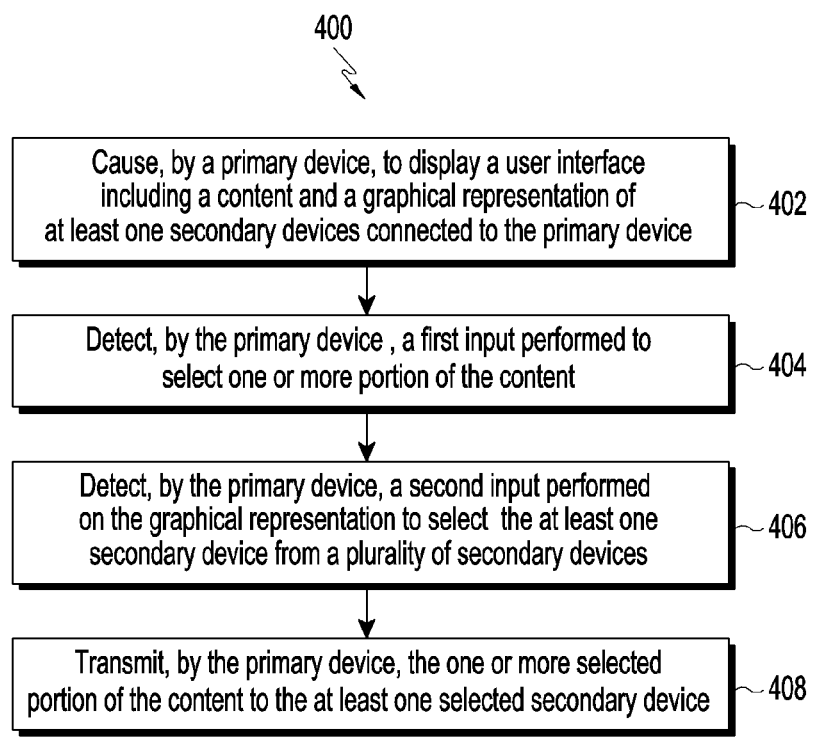
FIG. 4 is a flow diagram illustrating a method for managing display of content on at last one secondary device by the primary device, according to an exemplary embodiment.

FIG. 4 is a flow diagram 400 illustrating a method for managing display of the content on at least one secondary device 106 by the primary device 102, according to an exemplary embodiment. At step 402, the method includes causing to display the user interface 104 including the content and the graphical representation of the at least one secondary device 106 connected to the primary device 102. In an embodiment, the method allows the display unit 206 to cause to display the user interface 104 including the content and the graphical representation of the at least one secondary device 106 connected to the primary device 102.

At step 404, the method includes detecting the first input performed to select one or more portion of the content. In an embodiment, the method allows the content adaptation unit 204 to detect the first input performed to select one or more portion of the content. At step 406, the method includes detecting the second input performed on the graphical representation to select the at least one secondary device 106 from a plurality of secondary devices. In an embodiment, the method allows the content adaptation unit 204 to detect the second input performed on the graphical representation to select the at least one secondary device 106 from a plurality of secondary devices.

At step 408, the method includes transmitting one or more selected portion of the content to the at least one selected secondary device 106. In an embodiment, one or more selected portion is dynamically modified based on information about the at least one selected secondary device 106. In an embodiment, the method allows the communication unit 202 to transmit one or more selected portion of the content to the at least one selected secondary device 106.

The method allows the user to easily preview the content on his/her primary device 102 itself with actual shape and size of the secondary device 106. The method allows the user an intuitive way to edit the content based on the secondary device shape.

The various actions, acts, blocks, steps, and the like in the flow diagram 400 may be performed in the order presented, in a different order or simultaneously. Further, in some embodiments, some actions, acts, blocks, steps, and the like may be omitted, added, modified, skipped, and the like without departing from the scope of this disclosure.

Figure 5:
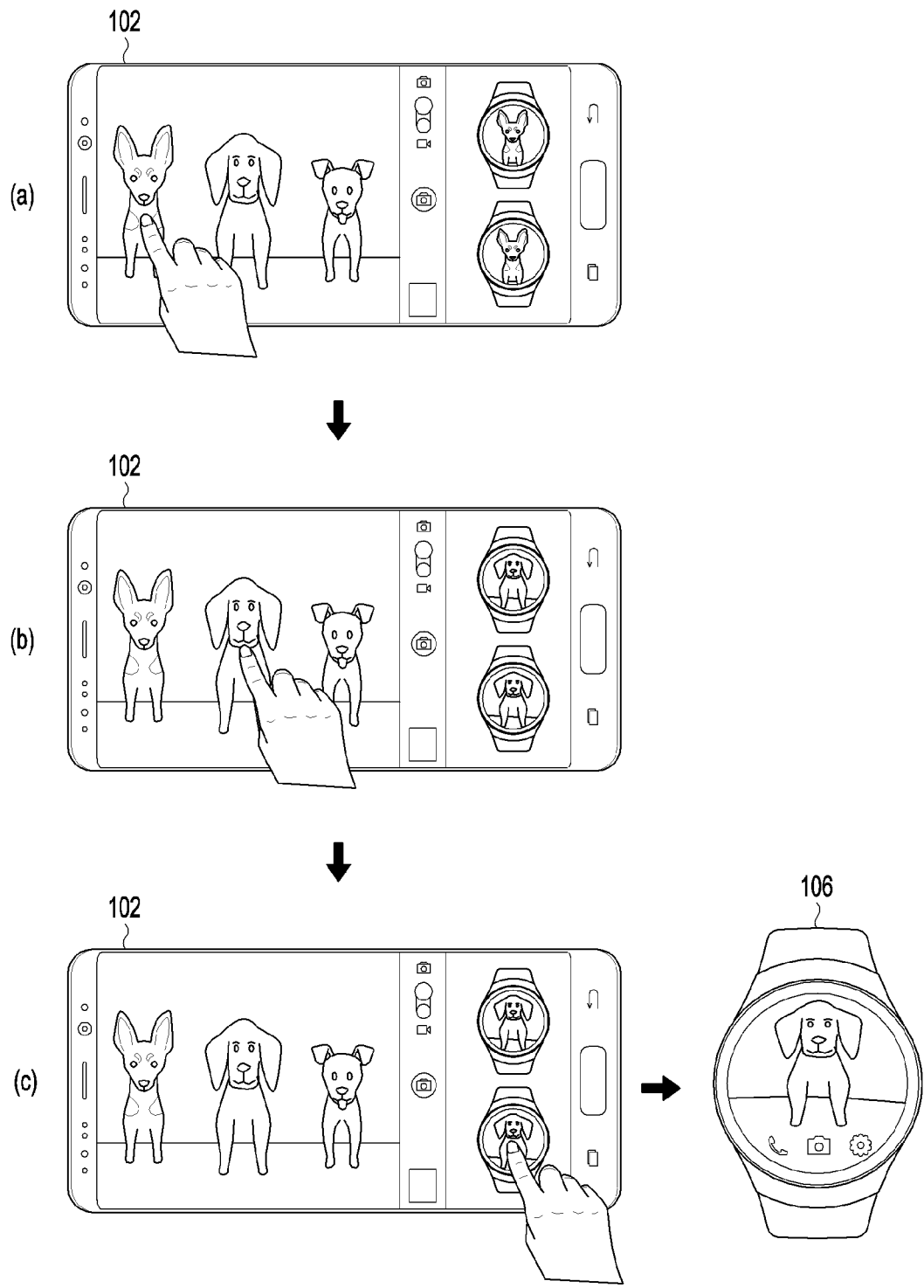
FIG. 5 is an example diagram illustrating that the content is displayed on the secondary device based on a user action on the primary device, according to an exemplary embodiment.

FIG. 5 is an example diagram illustrating that the content is displayed on the secondary device 106 based on the user action on the primary device 102, according to an exemplary embodiment. Initially, the display unit 206 displays the list of all connected secondary devices 106 along with the content. From a camera preview screen, the user of the primary device 102 can select any object of their choice on the display unit 206 as shown in the notation "A and B" of the FIG. 5. Further, the object boundary is calculated and the object content is shown on each display unit 304 of all connected/paired secondary devices 106. Further, the user can check the preview of selected object/content part on the connected secondary device 106 and can modify object/content part based on the preview. Furthermore, once the user selects any preview on the secondary device 106, the content is transferred to particular secondary device 106 as shown in the notation "C" of the FIG. 5.

Figure 6:
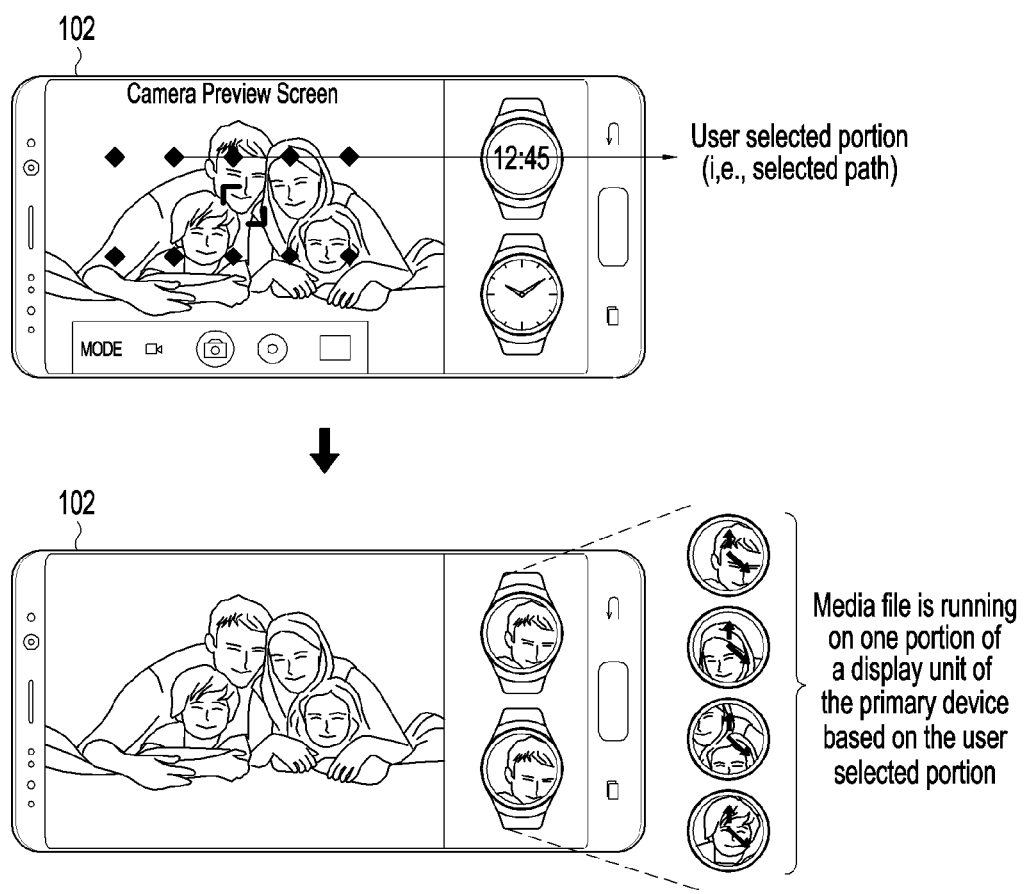
FIG. 6 is an example diagram illustrating that a media file is running on one portion of a display unit of the primary device based on a user selected portion, according to an exemplary embodiment.

FIG. 6 is an example diagram illustrating that the media file is running on one portion of the display unit 206 of the primary device 102 based on the user selected portion, according to an exemplary embodiment. Initially, the display unit 206 displays the list of all connected secondary devices 106 along with the camera preview screen. In an example, from the camera preview screen, the user of the primary device 102 can select any object of their choice on the display unit 206. The object boundary will be calculated and the object content will be shown on all connected/paired secondary devices 106. Further, the user can check the preview of the selected object/content part on the connected secondary device 106 and can modify object/content part based on the preview (i.e., the media file is running on one portion of the display unit 206 of the primary device 102 based on the user selected portion). In another example, the user of the primary device 102 can define the path by dragging the finger on the camera preview screen or the content displayed on the camera preview screen. Based on user defined path, the media file will be generated.

Figure 7A:
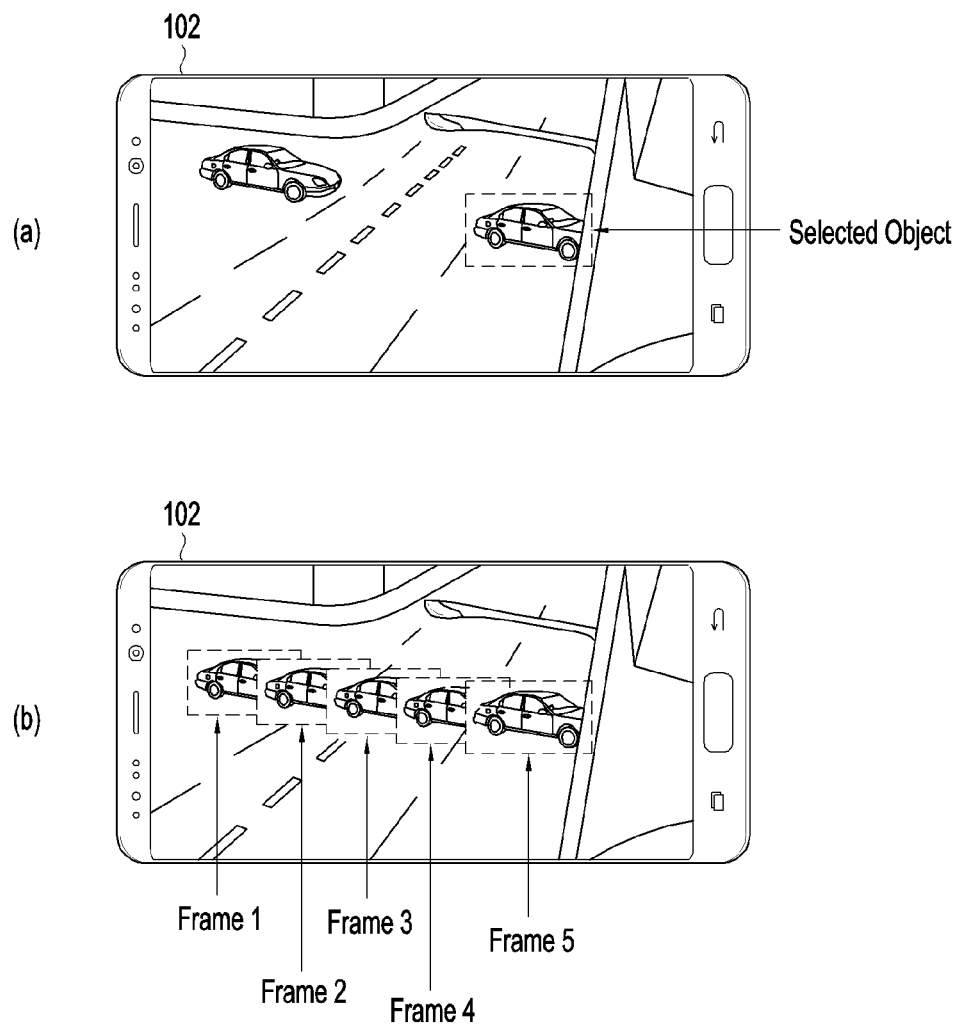
FIGS. 7A and 7B illustrate an example scenario in which a portion of image includes various segments are selected to form the media file to be played on the secondary device, according to exemplary embodiments.
Figure 7B:
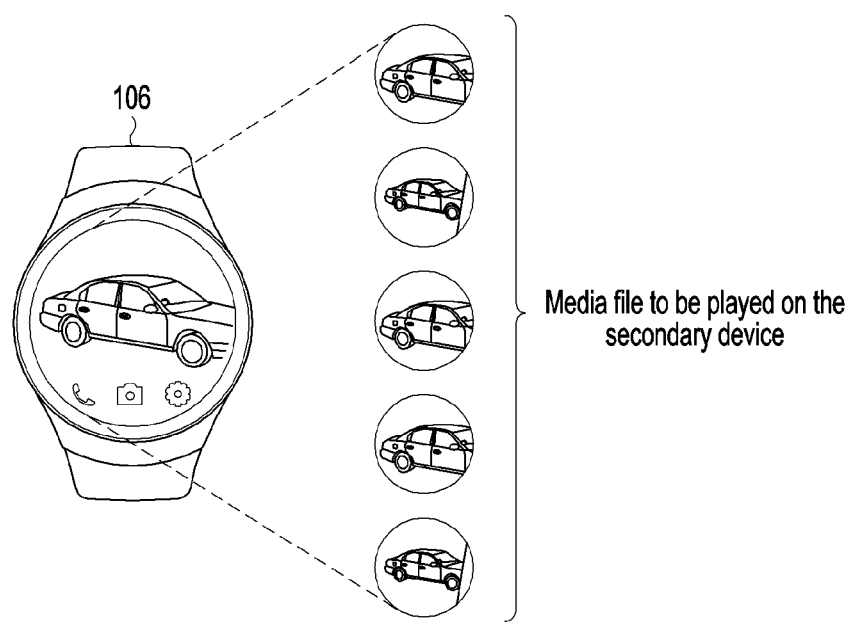

FIGS. 7A and 7B illustrate an example scenario in which the portion of image includes various segments are selected to form the media file (i.e., animation file) to be played on the secondary device 106, according to an exemplary embodiment. The user of the smart phone will select a specific object (i.e., car). Referring to notations "A and B" of the FIG. 7A, the object will be traced in the video dynamically until it disappears or for a specific threshold time. The user selects a specific section which would include all segments on that video file or GIF file. In the video file or the GIF file, the specific object is selected for the wearable device and that object is traced till it wouldn't disappear from the video file or the GIF file. After the short video/gif file is created on the smartphone, the short video/gif file is possible to view the preview the same on the smartphone itself and after final confirmation from the user of the smartphone. The short video/gif file will be finally transferred to the wearable device and the short video/gif file acts as a wallpaper on the wearable device as shown in the FIG. 7B.

In an embodiment, after the selection of any specific section or specific object, in background frames will be detected and stored internally in the storage unit 210 for final video/GE file creation. Further, the time can also be taken into consideration for the GIF file or video file creation. In an example, as shown in the FIGS. 7A and 7B, time selected by the user may be 1 second. Based on the time selection, the 5 frames are captured and stored within 1 second. Once the GIF file or the video file is created, it can be viewed on the smartphone for preview. After the preview of the short video file/gif file, the short video file/gif file will be finally transferred to the wearable device and the short video/gif file is act as the wallpaper on the wearable device.

In another example, the media file for the secondary device 106 is created based on the user provided path on any image/real scene from their primary device 102. The user provided path means that which portion of the content user want to modify. Initially, the user of the primary device 102 selects the camera preview screen. Further, the user of the primary device 102 provides the path on the content preview screen/camera preview screen. The path coordinates are stored with the content and a sample rate in the storage unit 210. The images are cropped/modified with size and shape of each connected secondary device 106 based on coordinates as centre. The set of contents is displayed on the primary device 102 as preview as explained in FIG. 6. Based on the selection by the user, the media file is transferred to the secondary device 106 and set as the clock face on the secondary device 106. The animation is played on the secondary device 106 as shown in the FIG. 7B.

Figure 8A:
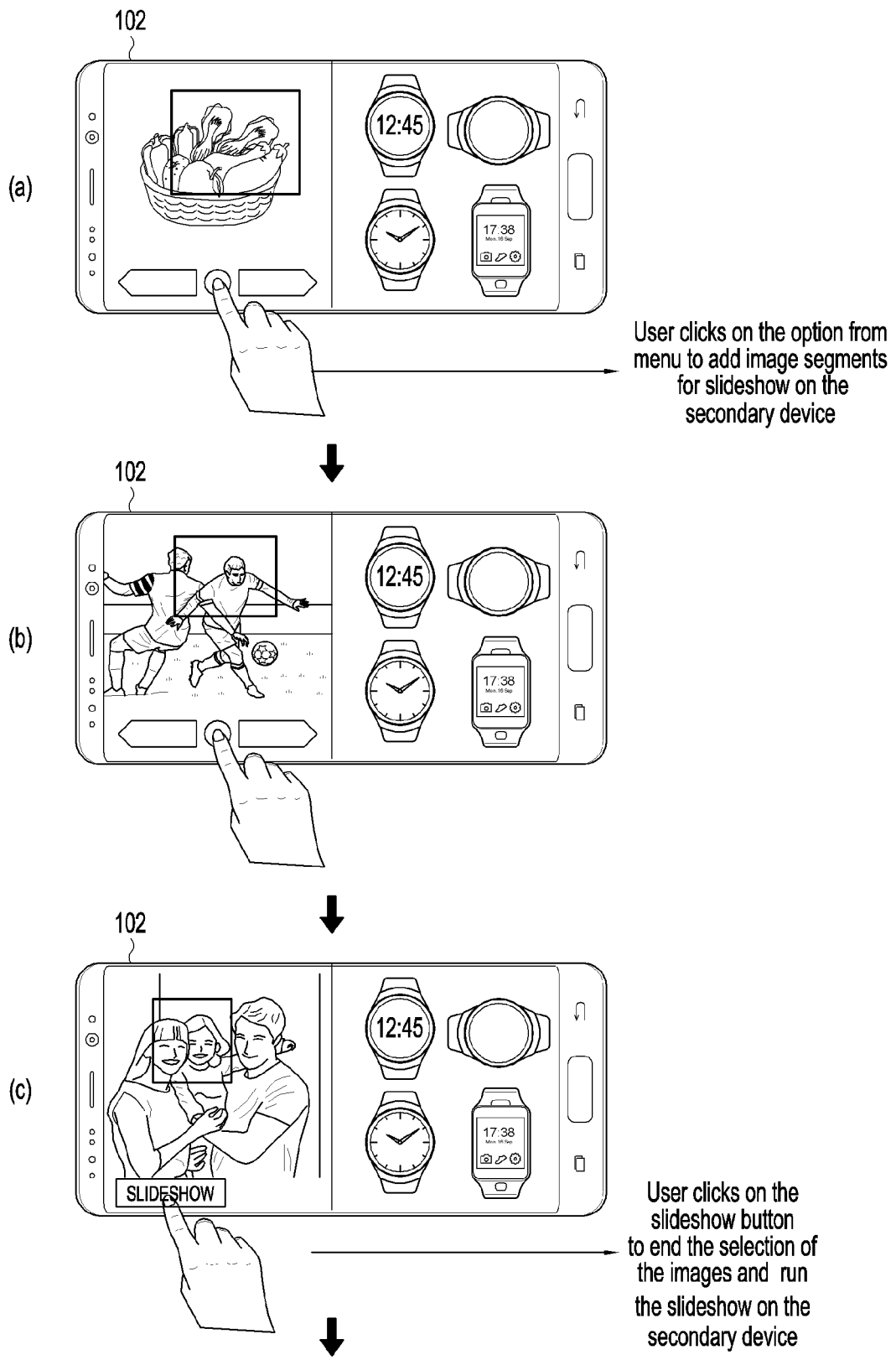
FIGS. 8A and 8B illustrate an example scenario in which various portions of images are added to form a slideshow to be played on the secondary device, according to exemplary embodiments.
Figure 8B:
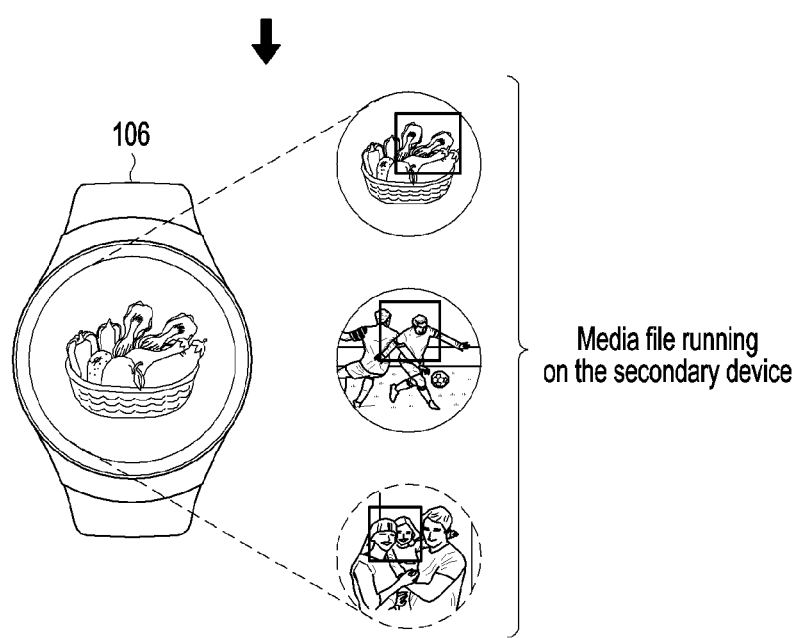

FIGS. 8A and 8B illustrate an example scenario in which various portions of images are added to form a slideshow to be played on the secondary device 106, according to exemplary embodiments. Referring to notations "A-C" of the FIG. 8A, the user of the primary device 102 can modify the section of content on the user interface 104 as per the shape and size of the secondary device 106 to form the slideshow. Once the user creates the slideshow, the user can setup a slideshow on the secondary device 106 with these segments as shown in the FIG. 8B.

Figure 9:
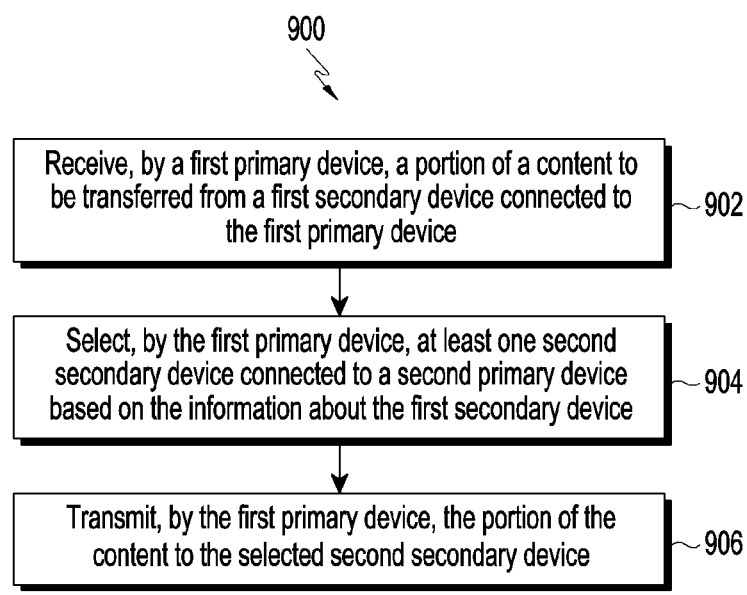
FIG. 9 is a flow diagram illustrating a method for managing display of the content, according to an exemplary embodiment.

FIG. 9 is a flow diagram 900 illustrating a method for managing display of the content, according to exemplary embodiments. At step 902, the method includes receiving the portion of the content to be transferred from the first secondary device connected to the first primary device. In an embodiment, the method allows the first primary device to receive the portion of the content to be transferred from the first secondary device connected to the first primary device. At step 904, the method includes selecting one or more second secondary device connected to the second primary device based on the information about the first secondary device. In an embodiment, the method allows the first primary device to select the at least one second secondary device connected to the second primary device based on the information about the first secondary device. At step 906, the method includes transmitting the portion of the content to the selected second secondary device. In an embodiment, the method allows the first primary device to transmit the portion of the content to the selected second secondary device.

The various actions, acts, blocks, steps, and the like in the flow diagram 900 may be performed in the order presented, in a different order or simultaneously. Further, in some embodiments, some actions, acts, blocks, steps, and the like may be omitted, added, modified, skipped, and the like without departing from the scope of this disclosure.

Figure 10:
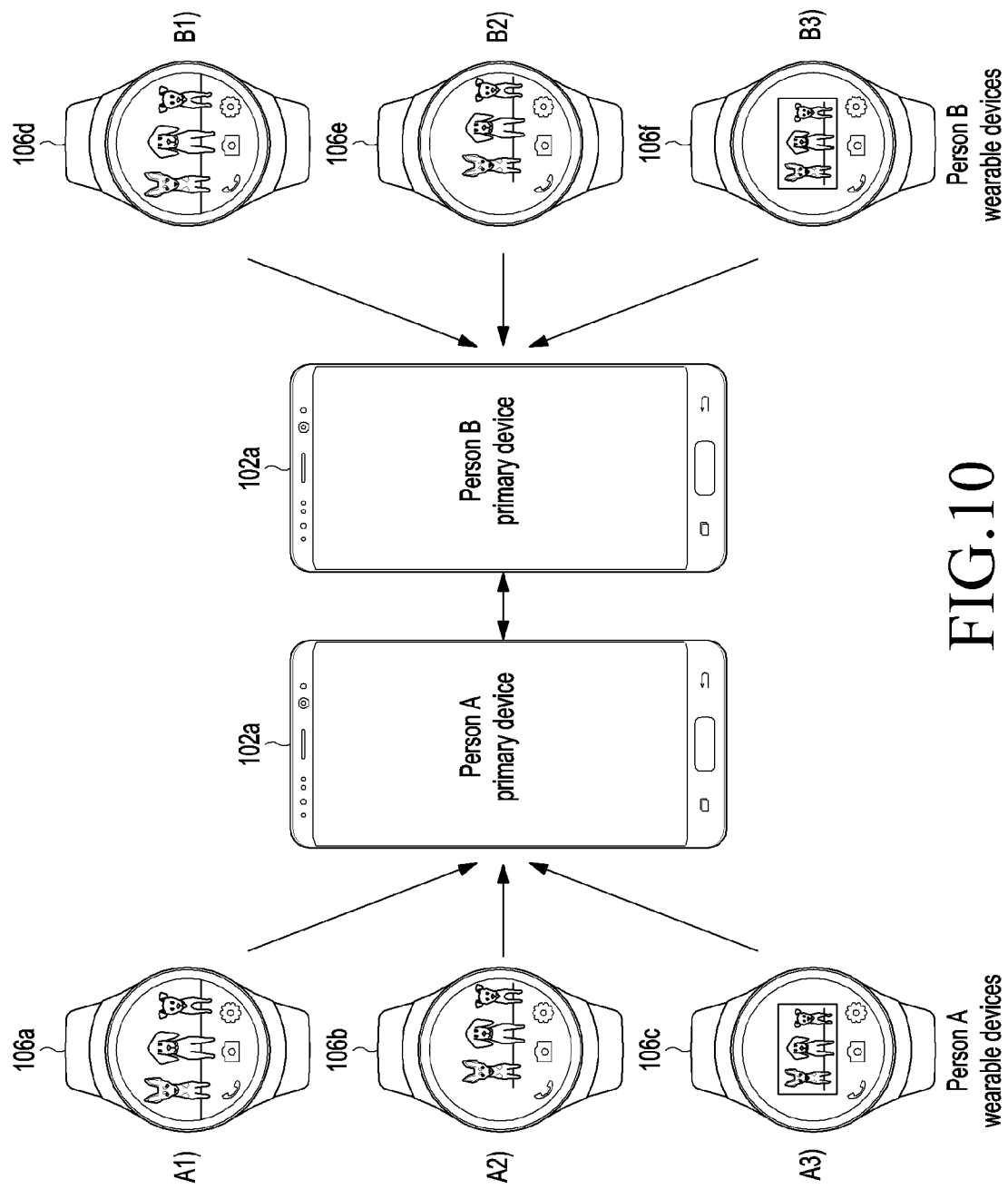
FIG. 10 is an example diagram illustrating that an information about a selected secondary device is shared with another secondary device, according to exemplary embodiments.

FIG. 10 is an example illustration in which an information about a selected secondary device is shared to another secondary device, according to exemplary embodiments. Consider a scenario, where the user having multiple wearable devices 106a to 106c wants to send the shape specific image to other user having multiple wearable devices 106d to 106f. It is common to understand that the image should be transferred to only that wearable device which is best fit for the image to be transferred.

In an example, a user A having wearable devices A1, A2, and A3 (106a-106c) wants to send shape specific image to appropriate wearable device of the user B having multiple wearable devices B1, B2, and B3 (106d-106f). The image to be transferred is rectangle-specific, hence the best way to transfer it to wearable device of the user B which is rectangular in shape, in this case the wearable device is 133. To implement concepts, the wearable shape table of the primary device of the user A will be shared with the primary device of the user B.

When the user A or B opens contact list in the wearable device A3, and selects user B to send the image. Below steps are used to transfer the image from the wearable device A3 to the wearable device 133.

The image will be transferred to person A's primary device with receiver contact as B1 and the image shape priority as circular, The image will be transferred to the primary device of person B with shape priority information.

Based on wearable device shape priority of image (rectangular), the image will be sent to wearable device B3.

Figure 11:
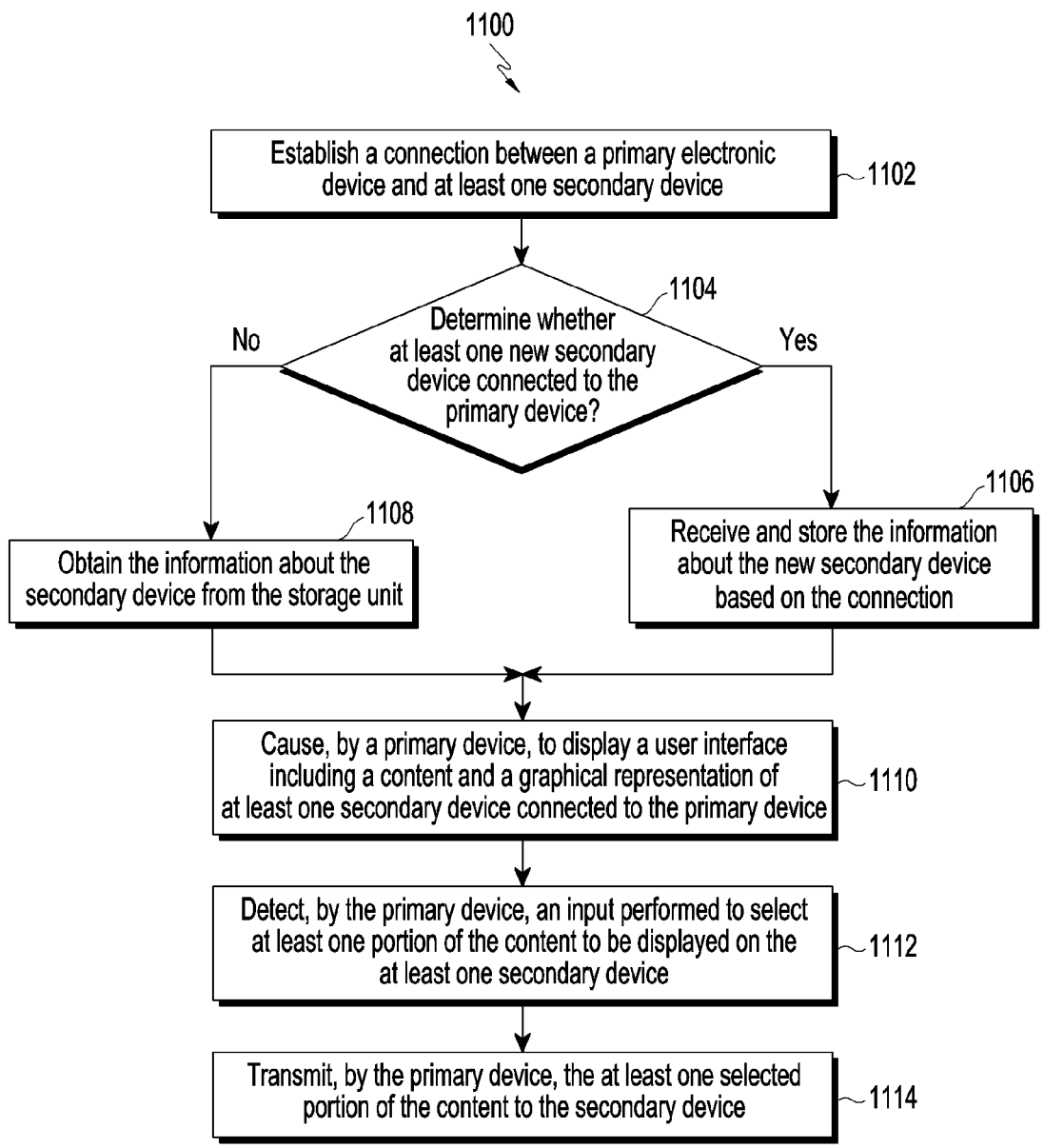
FIG. 11 is a flow diagram illustrating a method for managing display of the content while determining whether at least one new secondary device is connected to the primary device, according to exemplary embodiments.

FIG. 11 is a flow diagram 1100 illustrating a method for managing display of the content, while determining whether at least one new secondary device 106 is connected to the primary device 102, according to exemplary embodiments. At step 1102, the method includes establishing the connection between the primary device 102 and one or more secondary devices 106. In an embodiment, the method allows the communication unit 202 to establish the connection between the primary device 102 and one or more secondary device 106. At step 1104, the method includes determining whether at least one new secondary device connected to the primary device 102. In an embodiment, the method allows the processor unit 208 to determine whether at least one new secondary device is connected to the primary device 102. If at least one new secondary device is connected to the primary device 102 then, at step 1106, the method includes receiving and storing the information about the new secondary device. In an embodiment, the method allows the communication unit 202 to receive and store the information about the new secondary device.

If at least one new secondary device is not connected to the primary device then, at step 1108, the method includes obtaining the information about the secondary device 106 from the storage unit 210. In an embodiment, the method allows the object boundary detection unit 210 to obtain the information about the secondary device 106 from the storage unit 210.

At step 1110, the method includes causing to display the user interface 104 including the content and the graphical representation of one or more secondary devices 106 connected to the primary device 102. In an embodiment, the method allows the display unit 206 to display the user interface 104 including the content and the graphical representation of one or more secondary device 106 connected to the primary device 102.

At step 1112, the method includes detecting the input performed to select one or more portion of the content to be displayed on one or more secondary device 106. In an embodiment, the method allows the content adaptation unit 204 to detect the input performed to select one or more portion of the content to be displayed on one or more secondary device 106. At step 1114, the method includes transmitting one or more selected portion of the content to the secondary device 106. In an embodiment, one or more selected portion is dynamically modified based on information about one or more secondary device 106. In an embodiment, the method allows the communication unit 202 to transmit one or more selected portion of the content to the secondary device 106.

The various actions, acts, blocks, steps, and the like in the flow diagram 1100 may be performed in the order presented, in a different order or simultaneously. Further, in some embodiments, some actions, acts, blocks, steps, and the like may be omitted, added, modified, skipped, and the like without departing from the scope of this disclosure.

Figure 12:
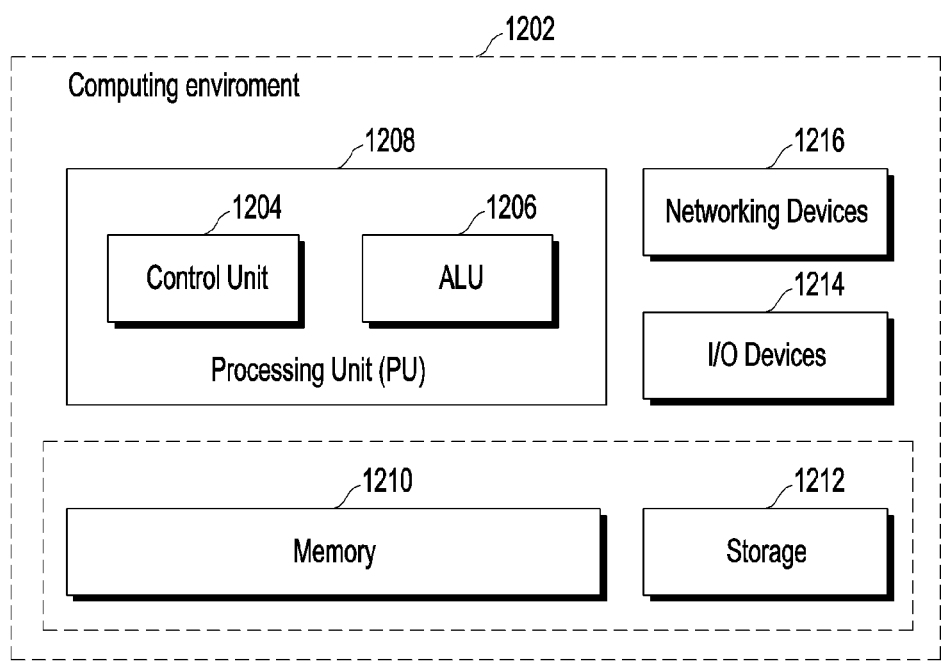
FIG. 12 illustrates a computing environment implementing a mechanism for managing display of the content on at least one secondary device by the primary device, according to exemplary embodiments.

FIG. 12 illustrates a computing environment 1202 implementing a mechanism for managing display of content on the plurality of secondary devices 106 by the primary device 102, according to exemplary the embodiments. The computing environment 1202 comprises at least one processing unit 1208 that is equipped with a control unit 1204, an Arithmetic Logic Unit (ALL) 1206, a memory 1210, a storage unit 1212, a plurality of networking devices 1216 and a plurality of Input/Output (I/O) devices 1214. The processing unit 1208 is responsible for processing the instructions of the technique. The processing unit 1208 receives commands from the control unit 1204 in order to perform its processing. Further, any logical and arithmetic operations involved in the execution of the instructions are computed with the help of the ALU 1206. The processing unit may be a processor.

The overall computing environment 1202 can be composed of multiple homogeneous or heterogeneous cores, multiple CPUs of different kinds, special media and other accelerators. The processing unit 1208 is responsible for processing the instructions of the technique. Further, the plurality of processing units 1204 may be located on a single chip or over multiple chips.

The technique comprising of instructions and codes required for the implementation are stored in either the memory unit 1210 or the storage 1212 or both. At the time of execution, the instructions may be fetched from the corresponding memory 1210 or storage 1212, and executed by the processing unit 1208.

In case of any hardware implementations various networking devices 1216 or external I/O devices 1214 may be connected to the computing environment 1202 to support the implementation through the networking unit and the I/O device unit. The networking device may be transceiver which can transmit and receive data or signal.

The exemplary embodiments disclosed herein can be implemented through at least one software program running on at least one hardware device including at least one processor and a memory, and performing network management functions to control the elements. The elements shown in the FIGS. 1 through 12 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for managing display of content on at least one secondary device by a primary device, the method comprising:

displaying, by the primary device, a first preview image, which is captured through a camera of the primary device, on a first area and graphical representations, which correspond to displays of secondary devices connected to the primary device, on a second area;

detecting, by the primary device, a first input performed to select at least one portion of the first preview image;

in response to detecting the first input, detecting, by the primary device, a boundary of the at least one selected portion, and displaying a plurality of second preview images corresponding to the detected boundary of the at least one selected portion in all of the graphical representations displayed on the second area while maintaining displaying the first preview image on the first area;

in response to detecting a second input performed to select a specific graphical representation from among the graphical representations, generating, by the primary device, content corresponding to the detected boundary of the at least one selected portion based on at least one of shape information or size information of a specific secondary device corresponding to the specific graphical representation; and transmitting, by the primary device, the content to the specific secondary device.

2. The method of claim 1, wherein the generating the content comprises generating the content further based on window size information of the specific secondary device.

3. The method of claim 1, wherein the at least one selected portion comprises one of a single segment of the first preview image and a set of segments of the first preview image determined based on the first input, wherein each segment of the first preview image is determined and stored in a temporary storage unit, wherein each segment of the first preview image is dynamically modified and packaged in a media file, and wherein each of the segments are dynamically determined based on a time unit.

4. The method of claim 3, wherein the media file is configured to play back an animation of the segments of the first preview image on the specific secondary device.

5. The method of claim 1, wherein the first input performed to select the at least one portion by one of:
   performing the first input to create a pattern on the first preview image, and selecting the at least one portion of the first preview image corresponding to the pattern; and
   displaying a plurality of templates comprising a pattern, performing the first input to select a template from the plurality of templates, and selecting the at least one portion of the first preview image covered by the pattern defined by the selected template.

6. The method of claim 1, wherein a user interface is dynamically updated to display a graphical representation corresponding to a display of a new secondary device connected to the primary device, wherein the primary device is configured to receive and store information about the new secondary device based on the connection.

7. A primary device for managing display of content on at least one secondary device, the primary device comprising:
   a display;
   a memory;
   a transceiver; and
   at least one processor coupled to the memory and the transceiver;
   wherein the at least one processor is configured to:
      control the display to display a first preview image, which is captured through a camera of the primary device, on a first area and graphical representations, which correspond to displays of secondary devices connected to the primary device, on a second area;
      detect a first input performed to select at least one portion of the first preview image;
      in response to detecting the first input, detect a boundary of the at least one selected portion, and control the display to display a plurality of second preview images corresponding to the detected boundary of the at least one selected portion in all of the graphical representations displayed on a second area while maintaining displaying the first preview image on the first area;
      in response to detecting a second input performed to select a specific graphical representation from among the graphical representations, generate content corresponding to the detected boundary of the at least one selected portion based on at least one of shape information or size information of a specific secondary device corresponding to the specific graphical representation; and
      transmit the content to the specific secondary device.

8. The primary device of claim 7, wherein the at least one processor is configured to generate the content further based on window size information of the specific secondary device.

9. The primary device of claim 7, wherein the at least one selected portion comprises one of a single segment of the first preview image and a set of segments of the first preview image determined based on the first input, wherein each segment of the first preview image is determined and stored in a temporary storage unit, wherein each of the segments are dynamically determined based on a time unit, and wherein each segment of the first preview image is dynamically modified and packaged in a media file.

10. The primary device of claim 9, wherein the media file is configured to play back an animation of the segments of the first preview image on the specific secondary device.

11. The primary device of claim 7, wherein the first input performed to select the at least one portion by one of:
   performing the first input to create a pattern on the first preview image, and selecting the at least one portion of the first preview image corresponding to the pattern; and
   displaying a plurality of templates comprising a pattern, performing the first input to select a template from the plurality of templates, and selecting the at least one portion of the first preview image covered by the pattern defined by the selected template.

* * * * *